United States Patent [19]

Nakahara et al.

[11] 4,421,540
[45] Dec. 20, 1983

[54] SYSTEM FOR PRODUCING AN OPTICAL FIBER PREFORM WITH GAS VOLUME CONTROL

[75] Inventors: Motohiro Nakahara, Mito; Tetsuo Miyajiri, Kanagawa; Naoki Yoshioka, Kanagawa; Toru Kuwahara, Kanagawa, all of Japan

[73] Assignees: Nippon Telegraph & Telephone Public Corporation, Tokyo; Sumitomo Electric Industries, Ltd., Osaka, both of Japan

[21] Appl. No.: 329,915

[22] Filed: Dec. 11, 1981

[30] Foreign Application Priority Data

Dec. 12, 1980 [JP] Japan ................................ 55-174730

[51] Int. Cl.³ ...................... C03B 19/00; C03B 37/07; C03C 23/00
[52] U.S. Cl. ..................................... 65/3.12; 65/18.2; 65/29; 65/30.1; 65/157; 65/160
[58] Field of Search ................ 65/3.12, 18.2, 29, 30.1, 65/157, 158, 160; 427/163; 118/715, 722

[56] References Cited

U.S. PATENT DOCUMENTS

| | | | |
|---|---|---|---|
| 4,278,459 | 7/1981 | Partus | 65/3.12 X |
| 4,280,829 | 7/1981 | Sheth | 65/3.12 X |
| 4,345,928 | 8/1982 | Kawachi et al. | 65/18.2 |

FOREIGN PATENT DOCUMENTS 54-103058  8/1979  Japan ................................. 65/18.2

*Primary Examiner*—Richard V. Fisher
*Attorney, Agent, or Firm*—Sughrue, Mion, Zinn, Macpeak and Seas

[57] ABSTRACT

A process for producing an optical fiber preform in a muffle furnace by hydrolyzing a gaseous glass forming material with a flame from an oxyhydrogen burner and depositing the resulting soot in a rod shape and an apparatus therefor are described, wherein a gas is supplied to the muffle furnace other than from said burner, and the volume supply of said gas is held constant by controlling the amount of a control gas supplied into an intermediate portion of an exhaust pipe through which the gases formed in the muffle furnace and the fine glass particles that do not deposit in a rod shape are discharged.

5 Claims, 3 Drawing Figures

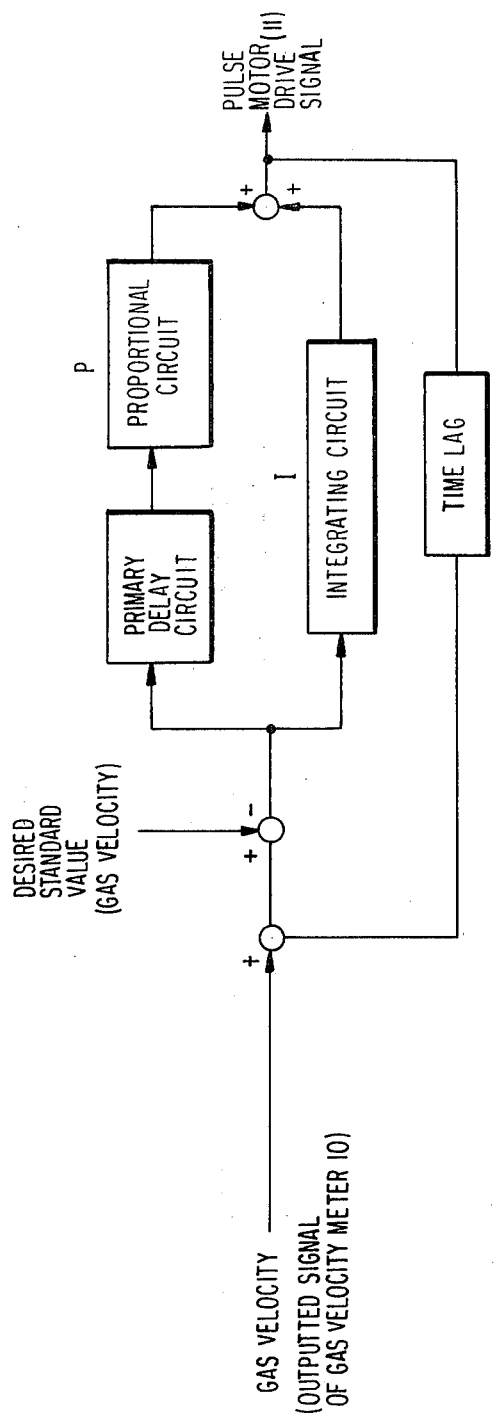

SYSTEM FOR PRODUCING AN OPTICAL FIBER PREFORM WITH GAS VOLUME CONTROL

FIELD OF THE INVENTION

The present invention relates to an improved process for producing an optical fiber preform and an apparatus therefor, and more particularly to a process for producing a good-quality optical fiber preform by supplying a muffle furnace with a constant volume of gas and an apparatus therefor.

BACKGROUND OF THE INVENTION

Fiber optics has drawn increasing attention from researchers as a medium for communications, and its technology has advanced to such a level that commercial optical fibers are now fabricated. However, studies are still being made on the method of reducing the transmission loss of the fiber.

A conventional apparatus for producing an optical fiber preform is illustrated schematically in FIG. 1 wherein a muffle furnace 1, i.e., a protective reaction vessel (usually having an inner volume of about 2 l to about 200 l) with an oxyhydrogen burner 2 disposed in the bottom thereof. The burner typically has a plurality of nozzles through which a glass forming material and a dopant for modifying the refractive index of the glass are issued upward to provide a predetermined distribution of gases in the muffle interior. The glass forming material is hydrolyzed (oxidized) with the flame from the burner and soot 4 deposits, initially on the tip of a supporting rod 3 facing the burner and then on the deposited face of the preform, as the rod is pulled up while it is rotated. However, as a result of the flame hydrolysis, reaction gases such as water vapor, hydrogen, chloride gas, and chlorine gas are formed in the muffle furnace, and these gases have adverse effects on the refractive index distribution, and other properties of the preform. To prevent this, the muffle furnace 1 is provided with an opening 5 through which air is supplied and an exhaust port 6 through which the undesired gases are discharged. The exhaust port 6 is connected to an exhaust pipe 7 which is connected to an exhaust gas treating means 8 (usually having a cross-sectional area of about 2 cm² to about 80 cm²) which is further connected to a fan 9 that exhausts the exhaust gas from the apparatus. The exhaust gas treating means 8 is generally a washing tower where the exhaust gas is contacted with water or an aqueous sodium hydroxide solution whereby the hydrogen chloride gas produced by the reaction between silicon chloride and hydrogen-oxygen was neutralized with the aqueous sodium hydroxide solution to prevent environmental pollution. In this arrangement, the gas is supplied through the opening 5, and after the reaction gases are treated by the means 8, they are then discharged into the external atmosphere. However, the reaction gases are not the only product that is brought into the means 8 through the pipe 7; the glass soot and hydrogen chloride gas are also carried into the means 8 through the pipe 7, and as a result, the soot builds up and the gas condenses on the inner wall of the pipe 7, to increase the resistance to the passage of the waste gas. If the waste gas is continuously discharged from the treating means 8 by the action of the fan 9, the increasing resistance of the inner wall of the pipe 7 causes a variation in the amount of the waste gas being discharged through the exhaust port 6, and hence, the amount of the gas being supplied through the opening 5 varies. As a consequence of this, the shape of the flame from the burner 2 is changed, or the position of the flame relative to the glass soot is changed. Furthermore, the temperature in the muffle furnace, and particularly the surface temperature of the soot 4, is varied, to eventually cause a change in the distribution of fine glass particles in the soot and/or in the distribution of refractive index of the product fiber. For these reasons, it has been difficult to produce a high-quality preform by the conventional process.

SUMMARY OF THE INVENTION

Therefore, one object of the present invention is to provide a process for producing a high-quality optical fiber preform with minimum variation in the axial distribution of refractive index by supplying a muffle furnace with a constant volume of a gas. This object of the present invention is achieved by a process for producing an optical fiber preform in the muffle furnace by hydrolyzing a gaseous glass forming material with a flame from an oxyhydrogen burner and depositing the resulting soot in a rod shape, wherein a gas is supplied to the muffle furnace other than from said burner. The volume supply of said gas is held constant by controlling the amount of a control gas supplied into an intermediate portion of an exhaust pipe through which the gases formed in the muffle furnace and the fine glass particles that do not deposit in a rod shape are discharged.

BRIEF DESCRIPTION OF THE DRAWING

FIG. 3 shows one embodiment of block diagram for an inner construction of the control panel.

PREFERRED EMBODIMENT OF THE INVENTION

Figure 1:
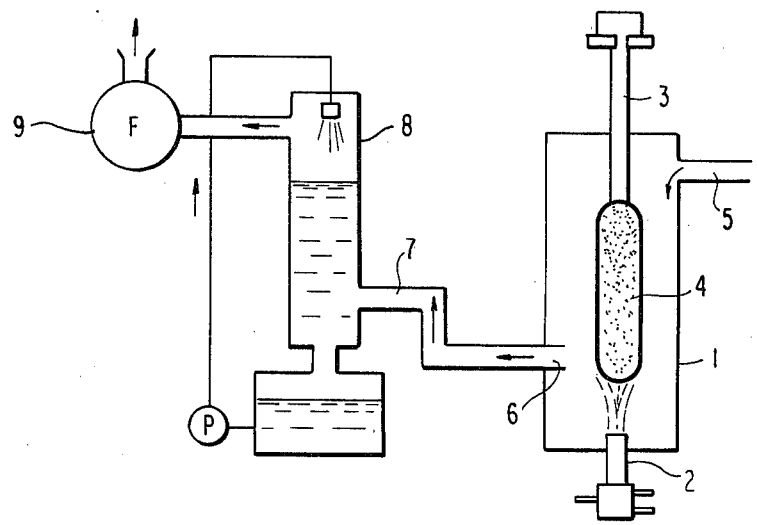
FIG. 1 is a schematic representation of a conventional process for producing an optical fiber preform.
Figure 2:
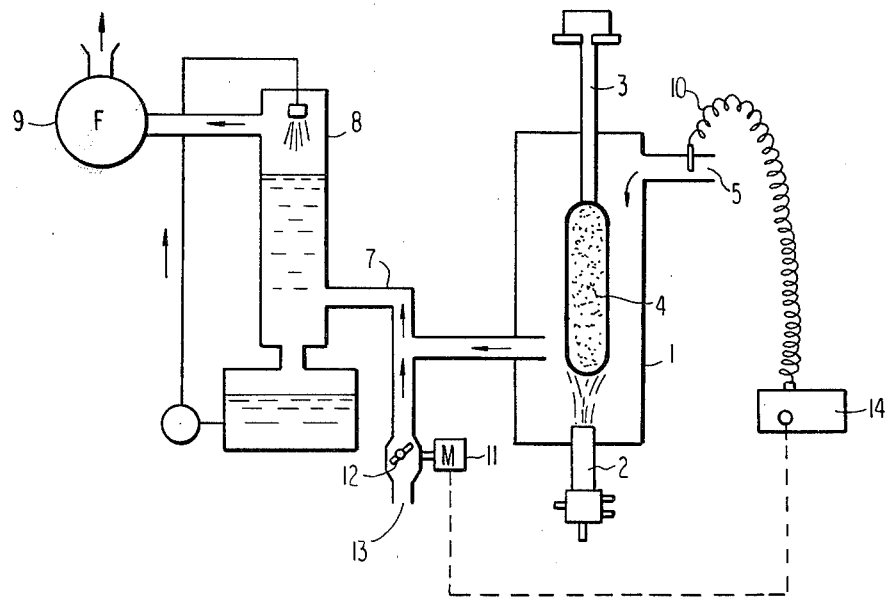
FIG. 2 is a schematic representation of one embodiment of an apparatus for producing an optical fiber preform according to the process of the present invention.

One preferred embodiment of the present invention is hereunder described by reference to FIG. 2, wherein the components which are the same as those illustrated in FIG. 1 are identified by like numerals. Additionally, an air gauge 10 is provided close to the opening 5; the gauge detects the amount of the gas being supplied into the muffle furnace 1 and uses the detected amount as a variable to be controlled. To supply a constant amount of gas, a branch pipe is connected at an intermediate portion of the exhaust pipe 7 and is connected to an adjustable damper 12 whose degree of opening is controlled by a pulse motor 11. The opposite side of the damper 12 is connected to an opening 13 through which the control gas is supplied, and in the illustrated embodiment, said side is open to the atmosphere to use air as the control gas. The pulse motor 11 is supplied with a control signal from the air gauge 10 through a control panel 14, e.g., a primary delay circuit feed-back control using a PI operation as illustrated in FIG. 3. The amount of gas to be supplied into the muffle furnace is controlled by holding the speed of the wind, constant, and the speed of the wind is controlled by adjusting the degree of opening of the damper 12. If the damper 12 is closed, the pressure differential in the muffle furnace 1 is increased, and more gas is supplied through the opening 5, whereas if the damper is opened, the pressure in the muffle furnace increases, and less gas is supplied through the opening 5, thereby increasing the volume of control gas to be supplied through the opening 13. In this manner, the volume of the gas supplied through opening 5 can be held constant by controlling the pulse motor 11 in response to the output signal from the air gauge 10.

By supplying a constant amount of the gas (air in the illustrated embodiment) into the muffle furnace 1, the flame from the burner 2 does not flicker, but assumes a constant shape, and the position of the flame is held constant with respect to the deposition face of the glass soot. In consequence, an optical fiber preform having a uniform axial distribution of refractive index as well as good baseband width property can be obtained. A test was conducted to demonstrate the advantages of the present invention over the case wherein the supply of the gas is not controlled. In this test, a cylindrical muffle furnace having an inner volume of 40 l and an exhaust pipe having an cross-sectional opening area of 12 cm² was used. The results are set forth below.

|  | Controlled | Not Controlled |
|---|---|---|
| Growth rate (indicated by the length of soot rod) | 2 ± 0.01 [mm/min] | 2 ± 0.05 [mm/min] |
| OD (diameter) | 60 ± 0.3 [mm] | 60 ± 2 [mm] |
| Baseband Width | 800 MHz · Km at 0.85 μm | 500 MHz · Km at 0.85 μm |
| Rate at which excess air is supplied through opening 5 | 40 ± 3 l/min | 30 ~ 50 l/min |

In the case of the present invention, the control air was supplied into the muffle furnace through the adjustable damper at a rate of from 10 to 15 liters per minute.

As the above description shows, the amount of the gas to be supplied into the muffle furnace is controlled in the present invention by supplying a control gas from a branch provided at an intermediate portion of the exhaust pipe. Therefore, the adjustable damper is not contacted by the waste gas and is entirely free from deleterious effects such as corrosion and pipe clogging. The air gauge is also free from the unwanted effects of the waste gas. Consequently, the present invention assures the production of an optical fiber preform of consistent quality that has a uniform distribution of refractive index and improved baseband width property. It should be noted that if the shape of the opening 5 in the muffle furnace, or the resistance of the pipe to the passage of the waste gas, is constant, keeping the pressure in the muffle furnace constant is equivalent to supplying a constant amount of the gas through the opening 5. It is also to be noted that even if a muffle furnace has no opening 5, the present invention can be used effectively as means to provide a constant volume of gas (usually air) flow into the muffle furnace through gaps, such as between the top hole in the muffle furnace and the supporting rod 3. However, in order to prevent stagnation of gas in the muffle furnace, the opening 5 and the exhaust port are preferably disposed in the muffle furnace at the positions as far as possible from each other. In the cylindrical muffle furnace installed vertically as illustrated in FIG. 2, the opening is preferably disposed at a higher position and the exhaust port is preferably disposed at a lower position but slightly higher than the upper end of the burner 2 so as to prevent a turbulent flow of upward gases issued from the burner. The opening 5 and the exhaust port 6, however, may be disposed at substantially an equal height on the opposite sides of the muffle furnace.

While the invention has been described in detail and with reference to specific embodiments thereof, it will be apparent to one skilled in the art that various changes and modifications can be made therein without departing from the spirit and the scope thereof.

What is claimed:

1. An improved apparatus for producing an optical fiber preform by the vapor deposition of glass soot onto a starting member, comprising a muffle furnace in which a gaseous glass forming material is hydrolyzed with a flame from an oxyhydrogen burner and the resulting soot is deposited in a rod shape, said muffle furnace being provided with a means defining an opening, a means for supplying treating gas into said muffle furnace to the opening created, an exhaust pipe through which the gases formed in the muffle furnace and the fine glass particles that do not deposit in a rod shape are discharged, wherein the improvement comprises:
    a means for supplying controlling gas into an intermediate portion of said exhaust pipe; and
    a control means provided at said intermediate portion of said exhaust pipe for controlling the amount of said control gas supplied into said intermediate portion of said exhaust pipe to maintain a constant volume supply of the treating gas.

2. The apparatus as claimed in claim 1, wherein said exhaust pipe is disposed at a position higher than the upper end of said burner.

3. The apparatus as claimed in claim 1, wherein said opening means is disposed at substantially the same level as or at a position higher than the position of said exhaust pipe.

4. A process for producing an optical fiber preform in a muffle furnace by hydrolyzing a gaseous glass forming material with a flame from an oxyhydrogen burner and depositing the resulting soot in a rod shape, wherein a gas is supplied to the muffle furnace other than from said burner, holding the volume supply of said gas constant by controlling the amount of a control gas supplied into an intermediate portion of an exhaust pipe through which the gases formed in the muffle furnace and the fine glass particles that do not deposit in a rod shape are discharged.

5. A process according to claim 4 wherein the pressure in the muffle furnace is controlled by a means for measuring the pressure differential in the muffle furnace and thereafter supplying the control gas into the intermediate portion of the exhause pipe.

* * * * *